United States Patent [19]
Elmer et al.

[11] Patent Number: 5,495,593
[45] Date of Patent: Feb. 27, 1996

[54] MICROCONTROLLER DEVICE HAVING REMOTELY PROGRAMMABLE EPROM AND METHOD FOR PROGRAMMING

[75] Inventors: Thomas I. Elmer, Santa Clara; Tuan T. Nguyen, Milpitas; Rung-Pan Lin, San Jose, all of Calif.

[73] Assignee: National Semiconductor Corporation, Sunnyvale, Calif.

[21] Appl. No.: 254,656

[22] Filed: Jun. 3, 1994

Related U.S. Application Data

[63] Continuation of Ser. No. 56,737, Apr. 28, 1993, abandoned, which is a continuation of Ser. No. 545,910, Jun. 29, 1990, abandoned.

[51] Int. Cl.$^6$ .................................................. G06F 12/00
[52] U.S. Cl. ................................ 395/430; 364/DIG. 1; 395/474
[58] Field of Search .................................... 395/425, 750

[56] References Cited

U.S. PATENT DOCUMENTS

| | | | |
|---|---|---|---|
| 4,420,819 | 12/1983 | Price et al. | 364/900 |
| 4,484,270 | 11/1984 | Quernemoen et al. | 364/200 |
| 4,751,633 | 6/1988 | Henn et al. | 364/200 |
| 4,763,252 | 8/1988 | Rose | 364/200 |
| 4,771,399 | 2/1988 | Snowden et al. | 395/750 |
| 4,794,558 | 12/1988 | Thompson | 395/425 |
| 4,807,114 | 2/1989 | Itoh | 395/800 |
| 4,920,481 | 4/1990 | Binkley et al. | 364/200 |
| 4,956,795 | 9/1990 | Yamaguchi et al. | 364/571.03 |
| 5,014,191 | 5/1991 | Padgaonkar et al. | 364/200 |
| 5,237,699 | 8/1993 | Little et al. | 395/750 |

FOREIGN PATENT DOCUMENTS

| | | |
|---|---|---|
| 0155403A2 | 9/1985 | European Pat. Off. . |
| WO-A-8002881 | 12/1980 | WIPO . |
| WO-A-8603328 | 6/1986 | WIPO . |

OTHER PUBLICATIONS

Microchip, DSP320EE12 "Digital Signal Processor With Integrated EPROM" 1988.
Microchip Application Notes Smart DSP "Unique Hardware and Software Features of the DSP320EE12" 1989.
Microchip Applications Notes Smart DSP "Key Design Issues When Using the DSP320EE12" 1988.
Richard Soja, "Single chip MCU EEPROM programming using bootstrap techniques", Electronic Engineering, vol. 60, No. 742, Oct. 1988 pp. 75-80.

*Primary Examiner*—Rebecca L. Rudolph
*Attorney, Agent, or Firm*—Limbach & Limbach

[57] ABSTRACT

A microcontroller device on a single integrated circuit including a central processing unit, an associated data bus and an electrically-programmable nonvolatile memory is disclosed. The nonvolatile memory contains the applications program and may be remotely programmed by way of a communication port, such as a universal asynchronous, receiver/transmitter (UART) device, utilizing a separate host computer. A second nonvolatile memory is provided which contains a control program which is executed by the central processing unit for carrying out the programming of the electrically-programmable nonvolatile memory utilizing data and address information received from the host computer over the communications port.

20 Claims, 8 Drawing Sheets

MICROCONTROLLER DEVICE HAVING REMOTELY PROGRAMMABLE EPROM AND METHOD FOR PROGRAMMING

This is a continuation of application Ser. No. 08/056,737 filed Apr. 28, 1993 which was an FWC of application Ser. No. 07/545,910 filed on Jun. 29, 1990 which is now abandoned.

BACKGROUND OF THE INVENTION

1. Field of the Invention

The present invention relates generally to apparatus and methods for programming memory systems and more particularly to apparatus and methods for programming a memory contained by a microcontroller or microprocessor utilizing certain existing features of the microcontroller or microprocessor, in conjunction with a host computer.

2. Description of Related Art

Microcontroller devices which utilize nonvolatile memories, such as Electrically Programmable Read Only Memories (EPROMs), are well known in the art. The EPROM generally contains the application software for the microcontroller and must be programmed with data depending upon the particular intended application for the microcontroller. The application software is generally developed using a personal computer, such as an IBM PC, and/or development system, such as a National Semiconductor microcontroller development system.

The data representing this application software, commonly known as a load module, are then transferred to special purpose programming equipment, such as a Data I/O Model 29 manufactured by Data I/O Corp. The EPROM of the microcontroller is then programmed by the special purpose programming equipment, usually without employing the processing capabilities of the microcontroller. When such special purpose programming equipment is used, the microcontroller is typically physically placed in the circuit of the programming equipment to accomplish the programming process.

Occasionally, it is necessary to modify the existing contents of the microcontroller's EPROM, such as during testing, development, or adjustment of the algorithm executed by the microcontroller. To perform this alteration with conventional microcontroller devices, it is usually necessary to remove the microcontroller from the system in which it is installed and place it in the circuit of the programming equipment.

Another technique that is currently used by microcontroller devices such as the Intel 87C196KB and the Motorola MC68HC705C8 can be referred to as automatic self programming (ASP). ASP requires that the microcontroller containing EPROM be placed in circuit with a source memory containing data that will be transferred to the microcontroller's EPROM. When appropriate control signals and programming voltages are applied, the microcontroller transfers data from the source memory to its own EPROM. Clearly, this technique requires the source memory to be preprogrammed by special purpose programming equipment.

Some microcontroller devices include provisions for programming the microcontroller EPROM while the unit remains installed in the system. These devices, such as the Intel 87C196KB, manifest a feature commonly known as run time programming. Run time programming schemes generally provide special circuits that allow user application software to modify the EPROM contents. This modification, or programming, is usually done by invoking a particular subroutine during the normal course of software execution. One disadvantage of run time programming is that it usually requires the user to devote a portion of the microcontroller's available memory space to support the programming function. This memory space is generally used for a software subroutine that serves as an interface between the user's application software and the microcontroller's programming mechanism. A second disadvantage of most run time programming mechanisms is that they are not well suited to programming a completely new (unprogrammed) microcontroller. Since most run time programming mechanisms are dependent on the above mentioned interface subroutine, they must have the interface subroutine installed by means of special purpose programming equipment before it can be used to program any of the remaining user memory space.

A microcontroller memory can also be programmed utilizing direct memory access (DMA). This technique is especially useful for transfers of large blocks of data between the memory and a peripheral device such as a high speed magnetic tape system. Data are written into the memory and read out of the memory by way of special channels which "steal" time slices from the central processor of the microcontroller whenever necessary. Each step of the DMA transfer is under the control of the peripheral device, with the transfer being essentially independent of the central processor, thereby enabling the processor to execute application programs while the transfer is taking place.

DMA transfers are relatively complex requiring a special DMA bus and DMA logic on the microcontroller. Further, the transfer of memory addresses and data are controlled by a processor in the peripheral device, rather than the microcontroller processor.

The present invention overcomes the above-noted shortcomings of conventional microcontroller devices. The EPROM of the device, which is completely blank or which contains an applications program, can be programmed utilizing conventional EPROM programming equipment. In addition, the subject device can be programmed after installation in a system, even if its program memory is completely blank, utilizing an external host computer. The user has complete freedom to program any data in the EPROM. The user is not required to provide a software interface subroutine of any sort to the programming mechanism, thereby maximizing the amount of memory space available for the application software. In addition, the microcontroller processor functions to program its own memory by executing a special control program thereby avoiding the complexity of DMA techniques. These and other advantages of the subject invention will become apparent to those skilled in the art upon a reading of the Detailed Description of the Preferred Embodiment together with the drawings.

SUMMARY OF THE INVENTION

A monolithic integrated circuit data processing device, such as a microcontroller, which is programmable by way of a separate host computer is disclosed together with a method of programming the device by the separate host computer.

The device includes a central processing unit and a data bus associated with the central processing unit. The device further includes communication port means, such as a universal asynchronous receiver/transmitter (UART), for providing a communication channel between the data processing device and the host computer. The channel is used to carry commands originating from the host computer to the device, with the commands including memory address information and data information.

The device further includes an electrically-programmable nonvolatile memory for storing application programs to be executed by the central processing unit. This memory is coupled to the data bus. Control means are further included which cause the central processing unit to write data based on the command data information of a received command into the electrically-programmable nonvolatile memory at an address based upon the command address information of the received command. The control means preferably includes a control memory which contains a control program which is executed by the central processing unit in order to write the data into the electrically-programmable nonvolatile memory.

DETAILED DESCRIPTION OF THE PREFERRED EMBODIMENT

System Description

Figure 1:
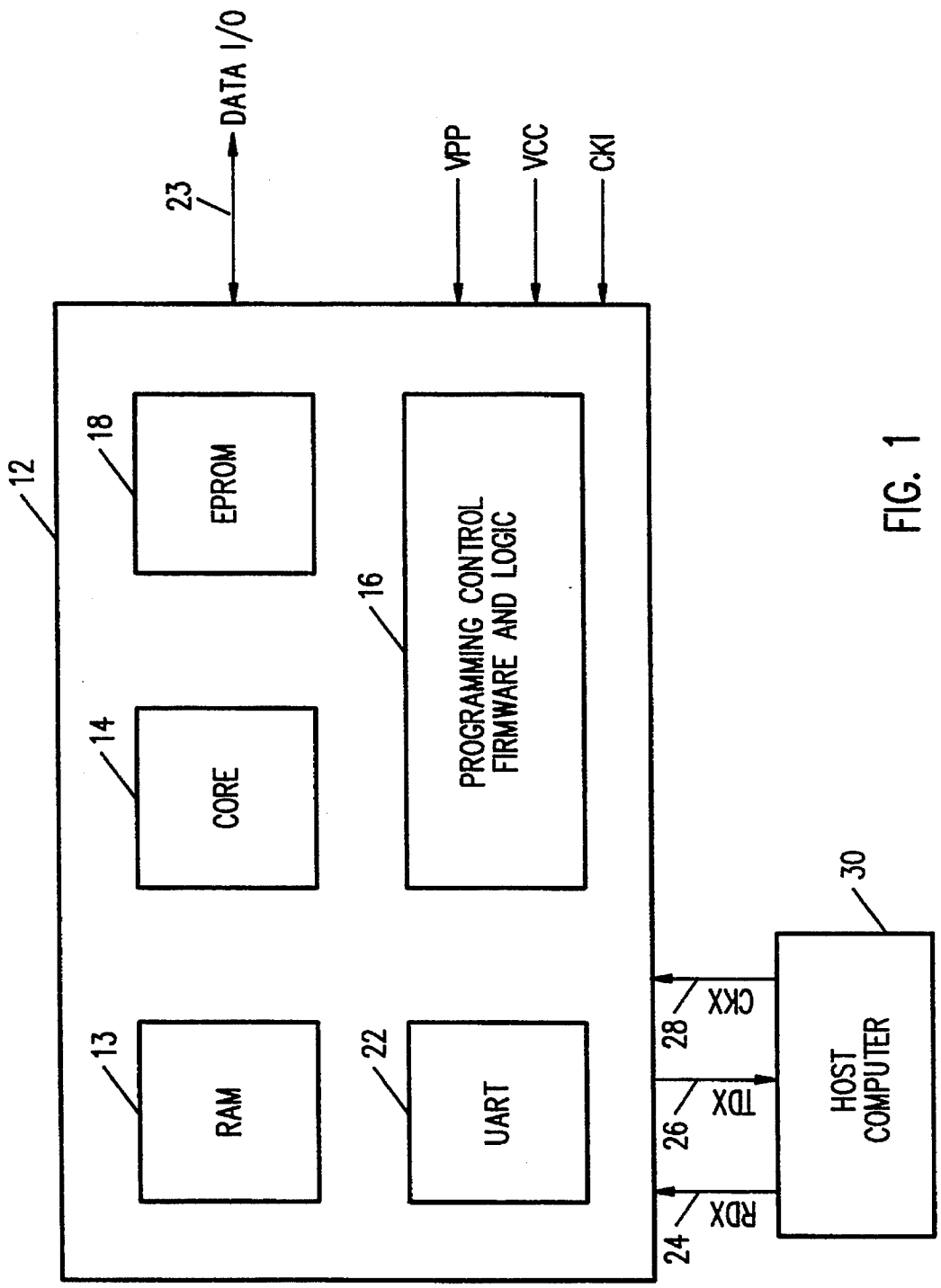
FIG. 1 is a simplified partial block diagram of the subject microcontroller device and associated host computer and serial data link.

Referring now to FIG. 1 of the drawings, the subject microcontroller device is designated by the numeral 12. Many of the details regarding the construction and operation of the microcontroller device are conventional to any microcontroller containing EPROM, and form no part of the subject invention. Accordingly, such details will not be disclosed so as to avoid obscuring the true nature of the subject invention.

Microcontroller device 12 includes a microcontroller core 14 which includes a central processing unit and other circuits commonly understood to comprise the architecture of a microcontroller. Core 14 provides the capability to execute software instructions and generates various signals for control of devices peripheral to core 14. Device 12 further includes a random access memory (RAM) 13 generally used as temporary storage during the course of software execution.

An electrically-programmable read only memory (EPROM) 18 is included in device 12 for storing the application program to be executed by the core central processing unit. By way of example, if the microcontroller device is part of an antilock braking system (ABS), then EPROM 18 may contain the application program for controlling the braking function.

EPROM 18 is a nonvolatile memory so that the stored data are retained when electrical power is not supplied to the device. EPROM 18 can be erased utilizing ultraviolet light, as is known by those of ordinary skill in the art. EPROM 18 can be substituted with other forms of similar nonvolatile memory such as electrically erasable programmable read only memory ($E^2$PROM).

Device 12 further includes programming control firmware and logic represented by block 16. Block 16 contains, in addition to other circuits, a nonvolatile memory. This nonvolatile memory within block 16 contains a program to be executed, as will be described, when the device enters what is referred to as the UART programming mode.

A communication port, in this case a universal asynchronous receiver/transmitter device 22 (UART), is provided for interfacing with the host computer. UART 22 is conventional in design and processes signals comprising a serial data link to the host computer. These signals include signal RDX on line 24 for receiving serial data from the host computer and signal TDX on line 26 for serially transmitting data to the host computer. In addition, an optional clock CKX may be present on line 28 which is generated by the host computer. Host computer 30 also includes a UART device (not depicted) used for processing these signals, comprising a serial data link to microcontroller 12.

The UART communication port is separate from and in addition to the data I/O port 23 used in conventional microcontrollers. Communication port 23 is coupled between the address/data bus of the controller, as will be described, and the external connection pins of the device.

Modes of Operation

Microcontroller device 12 is powered by two separate power supplies Vcc and Vpp. The main power to the device is supply Vcc which is commonly +5 volts. Supply Vpp is 12.75 volts and is used when EPROM 18 is to be programmed. Supply Vpp must be of the type which can be switched on and off or otherwise controlled electrically.

Microcontroller device 12 has five distinct modes of operation, including what is termed the EPROM mode, the UART programming mode, the run time programming mode, the memory cycle time test mode and the normal run mode.

The EPROM mode of operation is used when the EPROM 18 is to be programmed with special purpose programming equipment in accordance with presently practiced techniques for programming a microcontroller that contains EPROM. These techniques call for the microcontroller to be configured to emulate an EPROM memory device, such as an NMC27C256 memory device manufactured by National Semiconductor. An example of such programming equipment is the Data I/O Corporation Model 29B. This approach to programming microcontrollers that contain EPROM takes advantage of the well accepted, and well understood, methods and equipment for programming EPROM memory devices. Examples of other microcontrollers that manifest what may be referred to as an EPROM mode include the Intel 8749 and 8751.

The UART programming mode of operation is also used for the purpose of programming EPROM 18 and for reading out all or part of the EPROM contents. Rather than requiring the use of special purpose programming equipment, the UART programming mode allows the microcontroller EPROM to be programmed by an external host computer via a serial data link. This host computer can be a personal computer such as is commonly used in development of software to be executed on the microcontroller.

The run time programming mode employs many of the circuits necessary for UART programming mode. It performs much like existing run time programming mechanisms employed in devices such as the Intel 87C196KB. It is used primarily to program a few bytes of EPROM during the course of software execution, hence the name "run time".

The memory cycle time test mode of operation is used for testing the EPROM. The details for carrying out the memory cycle test are conventional in nature and form not part of the subject invention. Accordingly, no further descriptions of the memory cycle test mode will be given.

Finally, the normal run mode of operation is utilized when the EPROM has been programmed and microcontroller device 22 is performing its intended function of executing the application code. As previously noted, such intended function can encompass a wide variety of applications such as the control element of an automobile antilock braking system (ABS).

The EPROM mode is useful for programming the subject microcontroller device only when the device can be installed in special purpose programming equipment. It is preferred to utilize the UART programming mode in the event the device is to be programmed while installed in an operational environment. The run time program mode permits only very limited programming, as previously described when the device is so installed.

The UART programming mode provides a mechanism for host computer 30 (FIG. 1) to program EPROM 18. To accomplish this programming, host computer 30 transmits commands to microcontroller 12 via the shown serial data link consisting of signals RDX on line 24, signal TDX on line 26, and optional clock CKX on line 28. The received commands specify actions that are to be performed on EPROM 18. When configured in UART programming mode, microcontroller 12 executes control software stored in a memory within block 16. This software causes microcontroller 12 to receive commands from host computer 30 through UART 22. This software further processes the commands transmitted by host computer 30, and causes microcontroller 12 to perform the required actions on EPROM 18.

Configuration For UART Programming Mode

Figure 2:
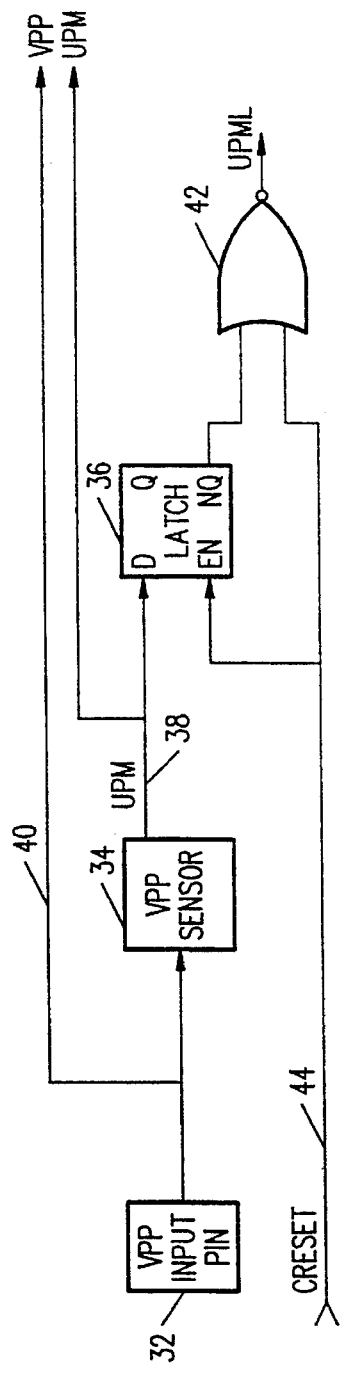
FIG. 2 is a functional diagram illustrating the conditions for causing the subject microcontroller device to enter the universal asynchronous receiver/transmitter (UART) programming mode of operation.

FIG. 2 is a simplified schematic diagram illustrating the manner in which the subject microcontroller device is forced to the UART programming mode of operation. Element 32 represents a pin on the subject device which is normally driven by either +5 volts or 0 volts. The voltage on element 32 is increased to voltage Vpp, which is +12.75 volts.

The subject device includes a voltage sensor 34 which produces output signal UPM when voltage Vpp is equal to approximately 12.75 volts ±0.55 volts. The output of voltage sensor 34 is connected to the D input of a latch 36. Latch 36 is clocked by signal CRESET. Accordingly, the Q output of latch 36 will be held at the falling edge of a CRESET pulse. The inverted output NQ of latch 36 together with signal CRESET on line 44 are connected to respective inputs of a NOR gate 42. The output of gate 42, signal UPML, is produced when both inputs to the gate are a logic "0".

Figure 3:
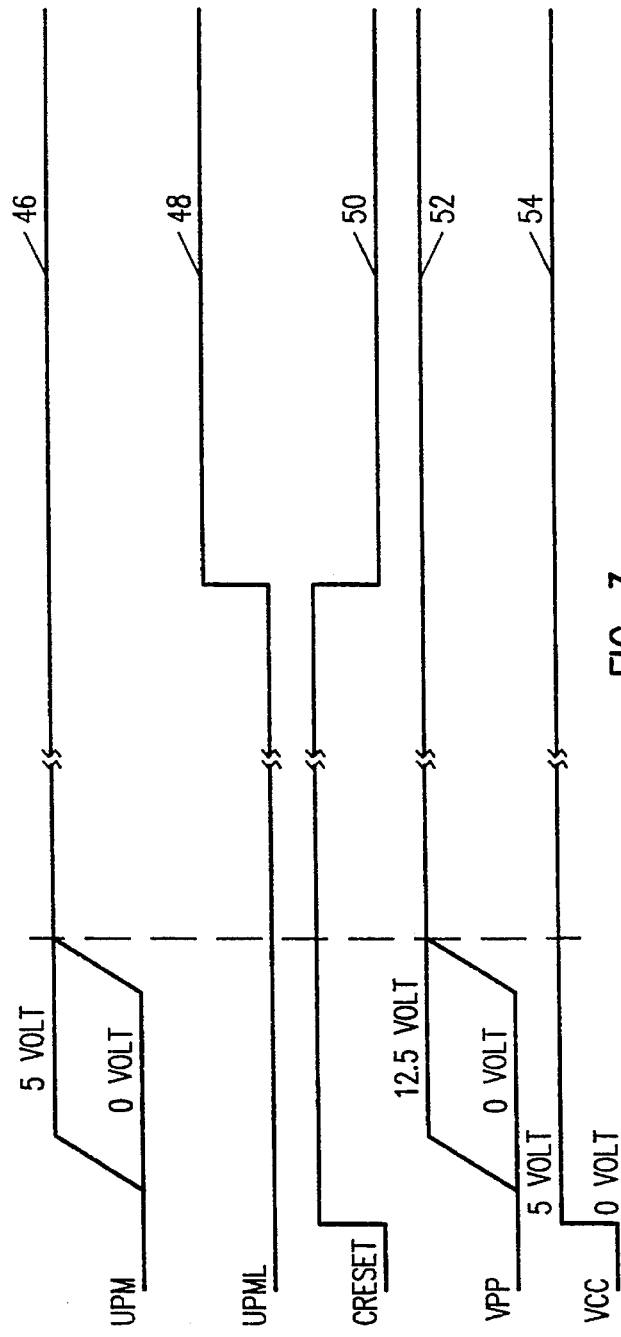
FIG. 3 depicts timing diagrams associated with the FIG. 2 functional diagram.

FIG. 3 shows the various waveforms associated with the FIG. 2 diagram, including voltage Vcc (54), voltage Vpp (52) applied to element 32, and the CRESET signal (50). The microcontroller device enters the UART programming mode when the gate 42 output signal UPML 48 (UART Program Latch) has a logic value of "1". This occurs when the inverted output NQ of latch 36 is a logic value "0" and CRESET has a logic value "0". Signal UPM is used to enable certain circuits and structures of the microcontroller that are employed during the UART programming mode and the run time programming mode.

Functions Needed To Support UART Programming Mode

Figure 4:
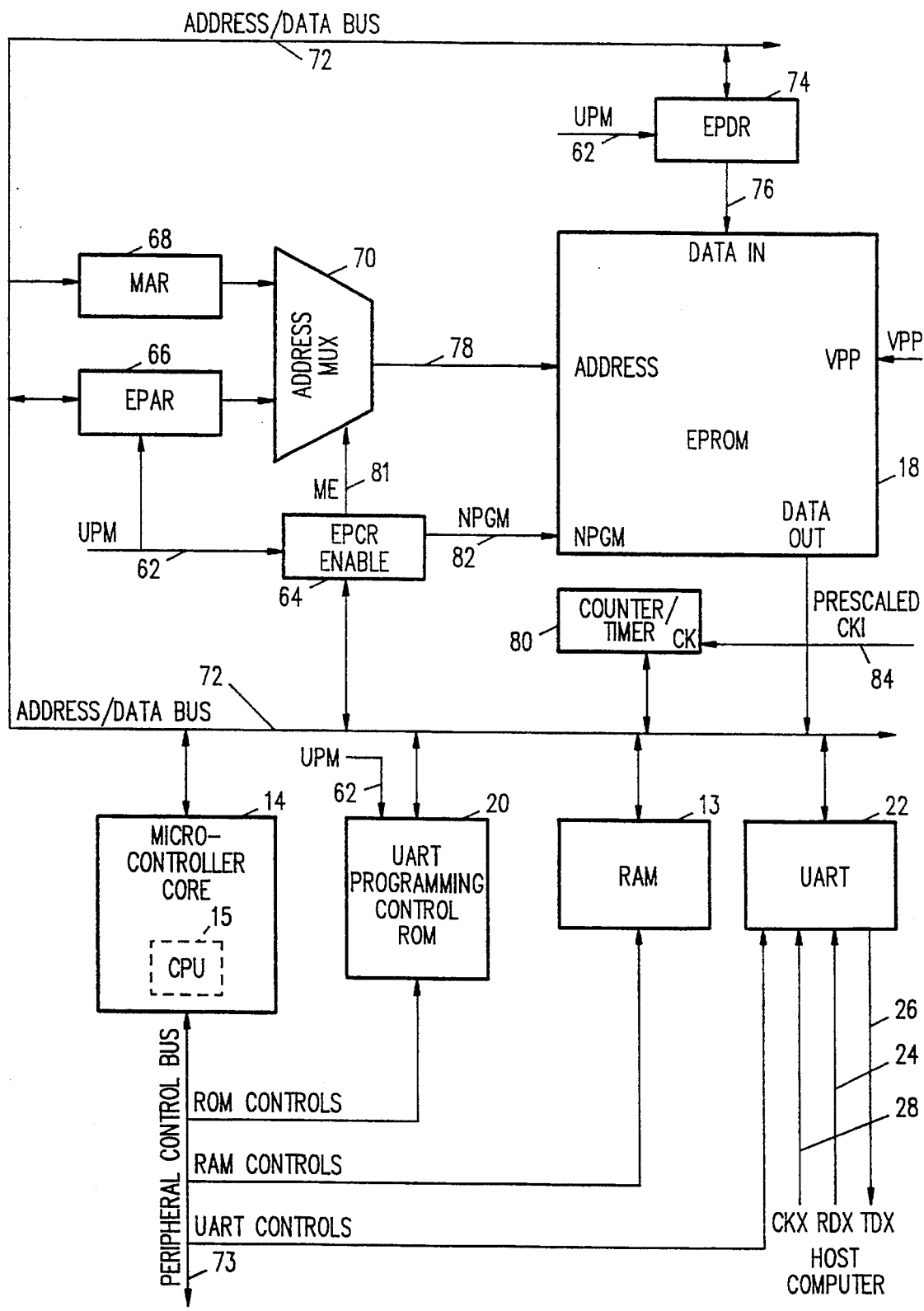
FIG. 4 is a block diagram of the subject microcontroller device illustrating functional blocks used during the UART programming mode of operation.

FIG. 4 is a block diagram of the subject microcontroller device showing those aspects of the device relating to the UART programming mode. The microcontroller core 14 includes a central processing unit 15. Core 14 produces various peripheral control signals on a peripheral control bus 73. These signals include, by way of example, UART control signals, ROM control signals, RAM control signals, timing control signals (not depicted) and the EPROM control signals (not depicted).

The subject microcontroller device includes a main bus 72 used to transport addresses and data, which is coupled to, among other devices, core 14, UART 22, UART programming control ROM 20, RAM 13, timer/counter 80, EPROM Data Register (EPDR) 74, Memory Address Register (MAR) 68, EPROM Address Register (EPAR) 66, EPROM Control Register (EPCR) 64, and the data out port of EPROM 18. The data in port of EPROM 18 is connected to the output of EPDR 74 via EPROM data in bus 76.

Address registers 68 and 66 are both used to hold address values for EPROM 18. MAR 68 is used for the normal fetch of instructions or data from EPROM 18 at run time. EPAR 66 is a memory mapped register, accessible only in the UART programming mode or run time programming mode, and is used to hold address values for EPROM 18 during the programming process. The address values used during the programming process are received from the host computer 30 (FIG. 1) by way of UART 22. The respective outputs of address registers 68 and 66 are multiplexed by address multiplexer 70 onto address bus 78, where they are available to the address input port of EPROM 18. Address multiplexer 70 is controlled by signal ME on line 81. When active, signal ME causes address multiplexer 70 to select the value contained in EPAR 66 for transmission to address bus 78. When inactive, signal ME causes address multiplexer 70 to select the value contained in MAR 68 for transmission to address bus 78.

The EPROM data register (EPDR) 74 holds data to be written into EPROM 18. EPDR 74 is an eight bit register which functions to hold the EPROM data input lines steady while the EPROM is programmed.

The EPROM program control register (EPCR) 64 is used to control the programming of EPROM 18. The outputs of register EPCR 64 include signal NPGM on line 82, which is a programming strobe, connected to the NPGM input of EPROM 18. As will be explained later in greater detail, an NPGM strobe is produced when an address of EPROM 18 is to be programmed with data. The outputs of register EPCR 64 also include signal ME on line 81 which controls address multiplexer 70, as explained previously.

UART Programming Control ROM 20 contains 256 bytes and functions as a shadow memory, which means the memory cannot be accessed during the normal run mode, but only in the UART program mode and the run time programming mode. In the UART programming mode, the 256 bytes of UART Programming Control ROM 20 are assigned addresses 0300 (hex) through 03FF (hex) of the processing unit 15 address space. Registers EPDR 74, EPAR 66, and EPCR 64 are also mapped in the shadow memory, meaning they cannot be accessed in normal run mode, but only in UART and run time programming modes. EPDR 74 is mapped at address 00FA (hex) in shadow memory. EPAR 66 is mapped at address 00FC (hex) in shadow memory. EPCR 64 is mapped at address 00FE (hex) in shadow memory. Thus, the "shadow memory" addresses are part of the processor address space in the UART programming mode and in the run time programming mode but are removed from the address space in the normal run mode.

Command Formats

As previously noted, when the subject microcontroller device is configured in the UART Programming Mode, CPU 15 proceeds to execute the control program stored in Control ROM 20. Among other things, this program implements a protocol for communicating with host computer 30 (FIG. 1), and processes commands received from the host computer.

The host computer commands are transmitted in separate eight bit (one byte) words. Four command types will be described. The first command, the Verify EPROM Data Command, causes the subject microcontroller device to read out data located at a particular EPROM address and transmit the data to the host computer 30. The first byte of this command includes four bits which identify the command type. The second four bits are not used. This byte is followed by two separate bytes which comprise an EPROM address. Microcontroller 12 will read a data byte from this EPROM address and transmit it to host computer 30.

The second type of command is the Prescaler Information Command which controls the duration of the internal program pulse NPGM on line 82 produced by register EPCR 64 (FIG. 4). The Prescaler Information Command is a single byte command which includes four bits which identify the command type and four bits which select a prescaler value for microcontroller 12. The prescaler value can vary from decimal 16 ($2^4$) to 131,072 ($2^{17}$) and is selected according to the prescaler command as indicated by Table 1, below.

TABLE 1

| Prescaler Command | Prescaler Value Selected |
|---|---|
| 00000111 | VALUES NOT ALLOWED |
| 00010111 | VALUES NOT ALLOWED |
| 00100111 | 16 |
| 00110111 | 32 |
| 01000111 | 64 |
| 01010111 | 128 |
| 01100111 | 256 |
| 01110111 | 512 |
| 10000111 | 1024 |
| 10010111 | 2048 |
| 10100111 | 4096 |
| 10110111 | 8192 |
| 11000111 | 16384 |
| 11010111 | 32768 |
| 11100111 | 65536 |
| 11110111 | 131072 |

The duration of the program pulse NPGM should be set in accordance with the following equation:

$$Tp = P \times \frac{16}{FCK1} \quad (1)$$

Where:

Tp is the program pulse NPGM duration;

P is the prescaler value selected; and

FCK1 is the frequency of the microcontroller system clock which typically ranges from 2 to 30 MHz.

In a normal programming environment, a programming pulse duration Tp of 0.5 milliseconds is usually sufficient for memories utilizing existing EPROM technology. In such an environment, the ambient temperature is between 20° C. and 30° C., voltage Vcc is between 5.75 V and 6.25 V and voltage Vpp is between 12.2 V and 13.3 V. The duration of pulse NPGM should be adjusted, as is well known in the art, in the event the temperature and voltages do not fall within the above-noted ranges.

The third command type is the Full Verify Command which is comprised of a single byte. The byte includes four bits identifying the command type. The remaining four bits are not used. The Full Verify Command causes the microcontroller device to read out and transmit to the host computer each of the 16,384 bytes of data stored in EPROM 18. This constitutes the entire contents of EPROM 18.

The fourth command type is the Program EPROM Command which is comprised of four bytes. The first byte transmitted from the host contains four bits which identify the type of command. The remaining bits are not used. The second and third bytes of the command comprise the address of the EPROM location to be programmed. Finally, the last byte transmitted contains the eight bits of data to be written into the EPROM.

Figure 7:
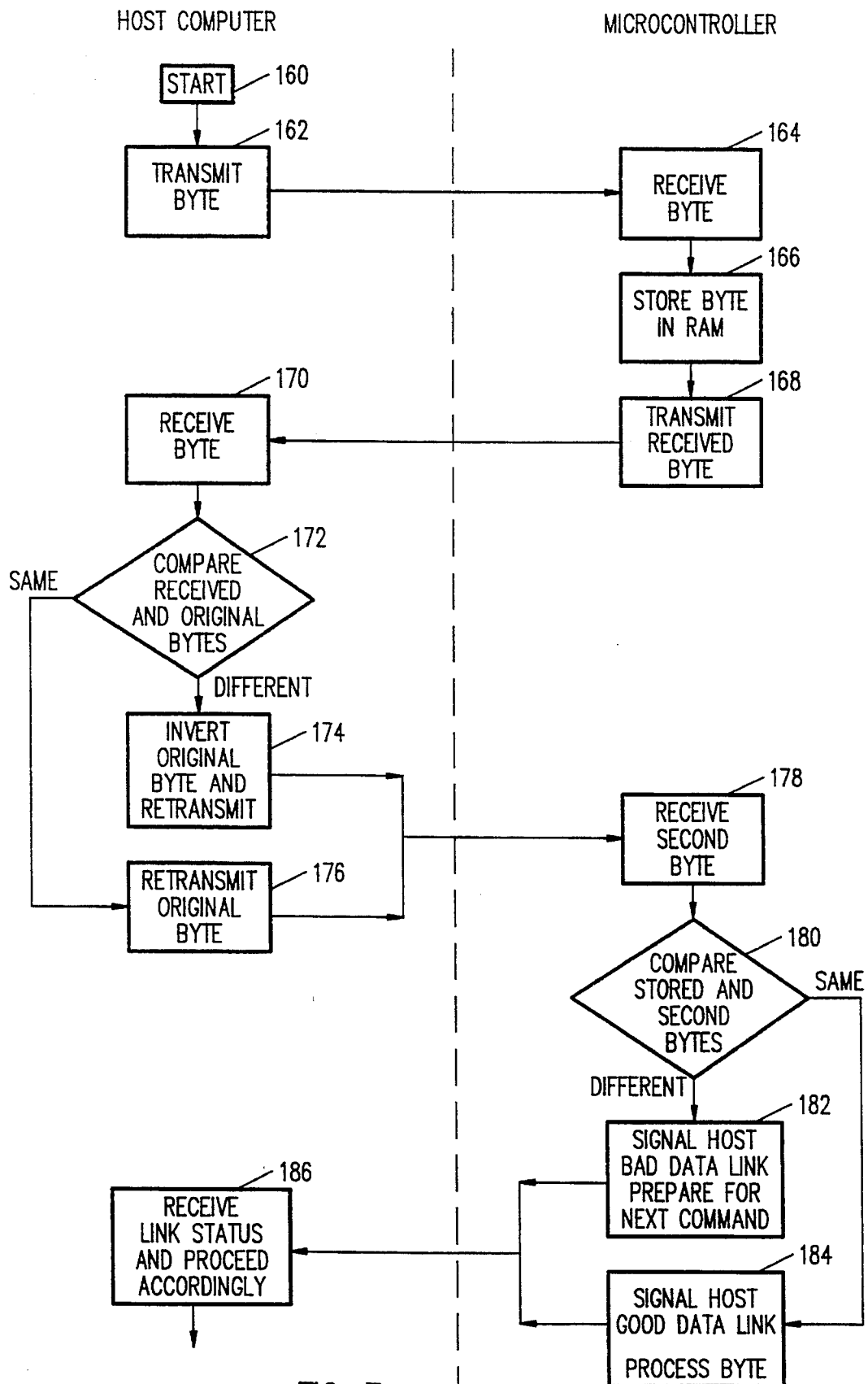
FIG. 7 is a flow chart depicting the data verification sequence employed by the subject microcontroller when receiving data from a host computer.

To ensure the integrity of the data transfer between the host computer and the subject microcontroller device, a double verification procedure is carried out on each byte received from the host. FIG. 7 is a flow diagram illustrating the double verification sequence.

Block 160 indicates the beginning of the sequence. As represented by blocks 162 and 164 of the diagram, a byte is received from the host computer by way of UART 22. The byte is stored in random access memory (RAM) 13 (FIGS. 1, 4) as indicated by block 166. The byte is then transmitted back to the host computer 30, as shown by blocks 168 and 170.

Upon receipt of the byte from microcontroller device 12, the host computer compares the received byte to the originally transmitted value (block 172). If these two byte values are the same, the host computer 30 simply retransmits the original value to microcontroller 12 (block 176). If the compared byte values are not identical, the serial data link between host computer 30 and microcontroller 12 has failed somehow. Accordingly, host computer 30 causes microcontroller 12 to recognize the failed data link by inverting all bits of the originally transmitted value before transmitting this byte a second time (block 174).

In either case, microcontroller 12 receives the second transmission (block 178) and compares this second byte value with the first byte value (block 180). If these compared values are identical, microcontroller 12 signals to this effect by transmitting a particular byte value to the host (blocks 184 and 186). Microcontroller 12 then proceeds to process the received byte value. If the compared values are not identical, such as when host computer 30 inverts all bits prior to the second transmission or on occurrence of a data link failure, microcontroller 12 signals to this effect by transmitting a particular byte value to the host (blocks 182 and 186). Microcontroller 12 then terminates processing of the present command and prepares to receive the next command from host computer 30.

Figure 6A:
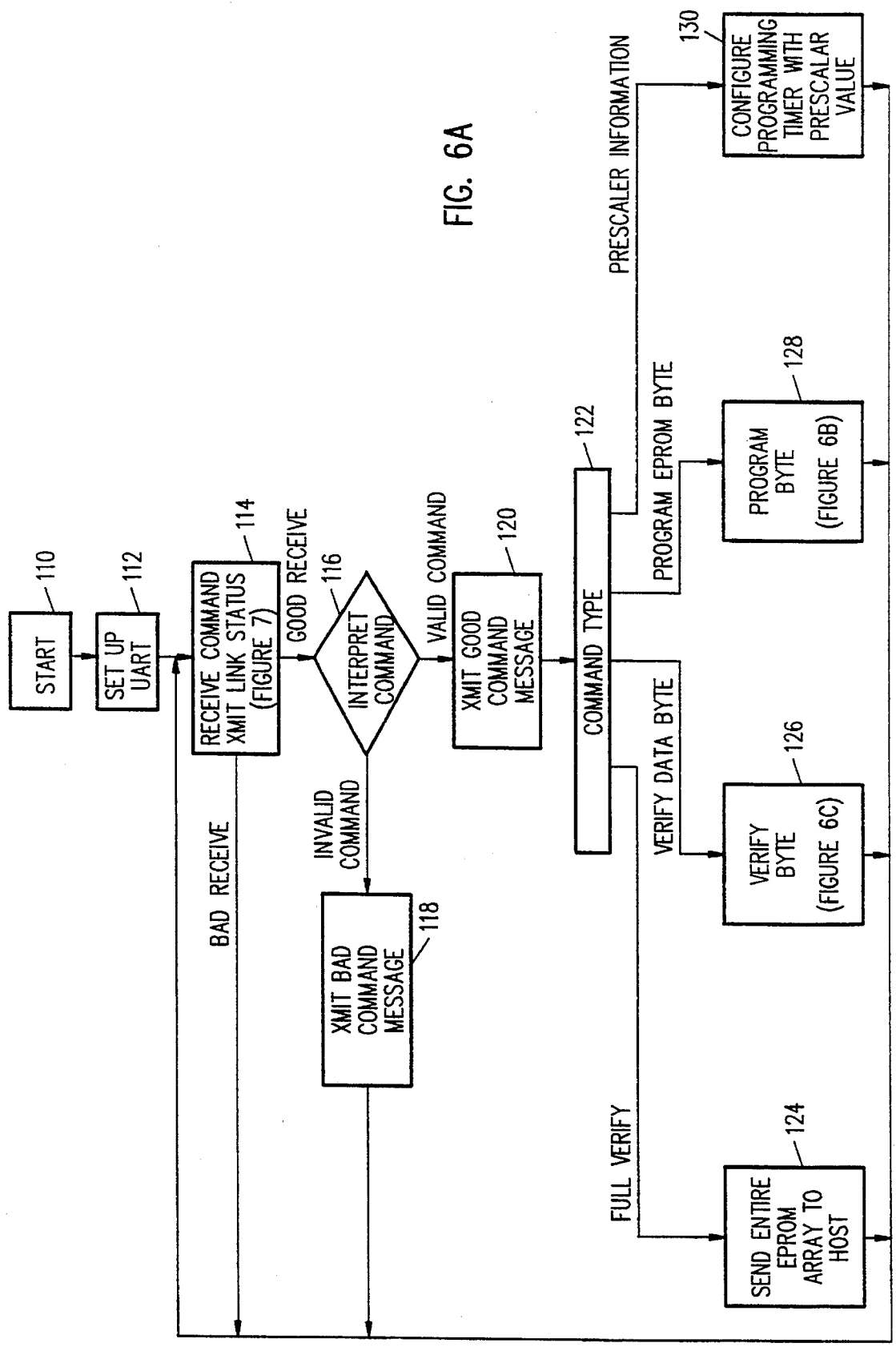
FIGS. 6A–6C are flow charts depicting the processing of commands from the host computer when the microcontroller device is in the UART programming mode.

FIG. 6A is a block diagram showing the command processing sequence as controlled by the control software stored in control ROM 20 (FIG. 4). The sequence begins when the microcontroller device enters the UART Program Mode (block 110). The microcontroller core 14 then proceeds to configure certain on chip peripheral functions by executing the program stored in control ROM 20. Among other things, the initialization sequence configures UART 22 (block 112), to utilize external clock CKX, and sets the length of each word to be eight data bits, with one stop bit for transmitting and receiving data.

Once the initialization sequence is completed, the microcontroller waits for commands from the host computer, as indicated by block 114. When the first byte of a command is received, the command byte is subjected to the double verification sequences described in connection with FIG. 7. Assuming that the double verification is successful, a determination is made as to the type of command by examining the four command type bits (block 116) of the byte. If the received command does not pass the FIG. 7 double verification sequence, (block 114), a message is transmitted to the host that the data link is bad and the microcontroller prepares for the next command.

If the command is not a valid command (block 116), a bad command message is transmitted back to the host computer (block 118). If the command is valid, a good command message is transmitted back to the host (block 120). The sequence then proceeds based upon the type of valid command received (block 122).

Assuming that the received command is a Full Verify Command, the microcontroller will proceed to read out the entire contents of the EPROM 18 and transmit the results to the host computer (block 124). The data are read out of the EPROM and the transmitted to the host one byte at a time. The sequence will then return to block 114.

Figure 6B:
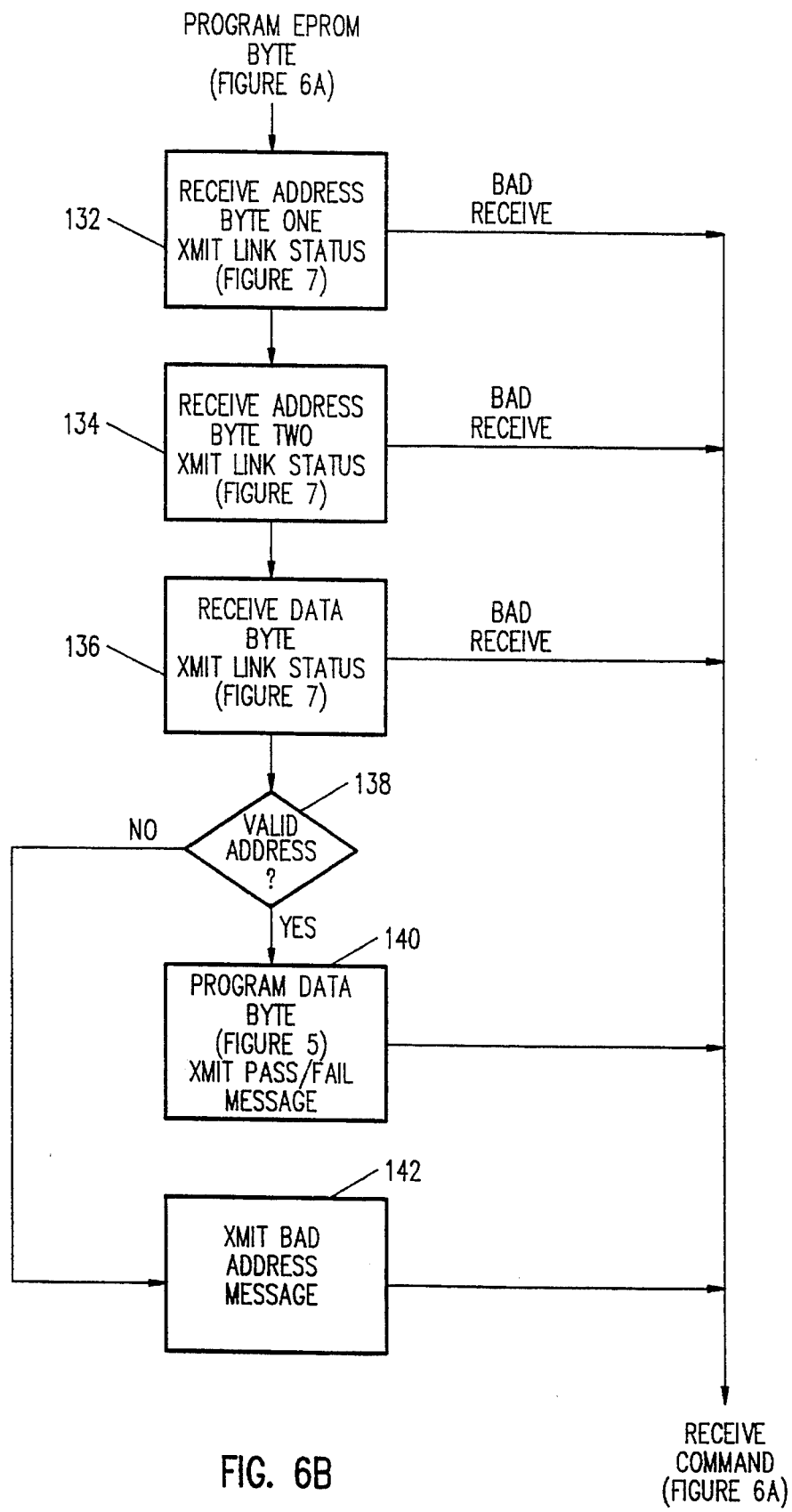

If the received command is a Prescaler Information Command, a prescaler value will be indicated as shown in Table 1 (prescaler value selection) by the four most significant bits of the command byte. This command is only one byte. The indicated prescaler value is used to configure a programming timer (block 130). The indicated prescaler value is used as a frequency divider for microcontroller system clock CKI (FIG. 1). The resultant divided value of CKI (lower frequency than the original CKI) is referred to as Prescaled CKI on line 84 (FIG. 4) and is used as the synchronous clock for a 16 bit counter/timer 80 (FIG. 4). Counter/timer 80 is memory mapped, in the architecture of microcontroller 12, and is used by the software executing from control ROM 20 to control the duration of signal NPGM on line 82 (FIG. 4). Thus, host computer 30 can configure microcontroller 12, in accordance with Table 1 and equation 1, to generate a program strobe NPGM of appropriate duration for the environment in which the microcontroller is to be programmed. Once programming timer 80 (FIG. 4) has been configured with the appropriate prescaler, the sequence returns to block 114 (FIG. 6).

The Program EPROM Command is comprised of four bytes, including the first byte which contains the command type information. Assuming that the received command is a Program EPROM Command, a sequence for programming one byte of data will be carried out (block 128) as shown in the flow chart of FIG. 6B. The microcontroller will wait for the next two bytes of address information to be received, as shown by blocks 132 and 134. Each of these bytes is subject to double verification as described in connection with FIG. 7. Once the two address bytes are received, they are concatenated and the sixteen bit address is temporarily stored in RAM 13.

Microcontroller device 12 then waits for receipt of the data byte (block 136) which is also double verified. After it is received, the data byte is also temporarily stored in RAM 13. The address value received (blocks 132 and 134) is then evaluated to determine whether it is appropriate for an EPROM access (block 138). If the address value is not appropriate, microcontroller 12 will signal host computer 30 to this effect (block 142) and then prepare to receive the next command (block 114 of FIG. 6A). If the address value is acceptable for an EPROM access, microcontroller 12 will then load the temporarily stored data into EPDR 74 (FIG. 4) and the temporarily stored address into EPAR 66 (FIG. 4). The microcontroller will then write the data held in EPDR 74 at the EPROM address held in EPAR 66. As will be described, the programming of EPROM 18 is preferably carried out utilizing an interactive programming sequence. Microcontroller 12 will notify host computer 30 with respect to whether the programming was successful (block 140).

Figure 6C:
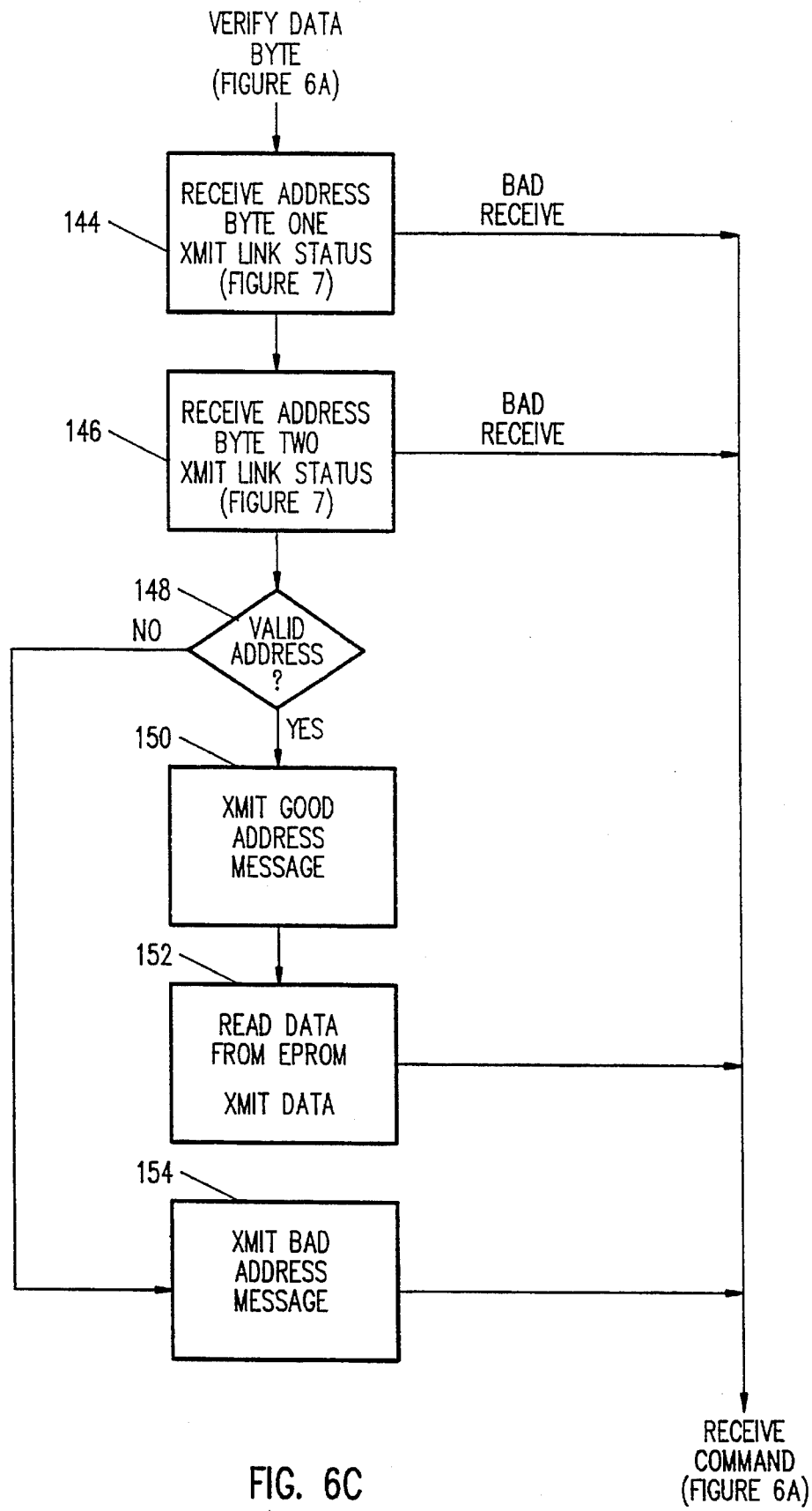

Assuming that the command is a Verify EPROM Data Command, a sequence will be carried out to verify a designated EPROM 18 address (block 126), as represented by the flow chart of FIG. 6C. The microcontroller will wait for receipt of the two follow-up bytes which contain the EPROM address to be read out. When each address byte is received it is double verified (blocks 144 and 146), as previously described in connection with FIG. 7.

If two address bytes are received with no transmission errors, they are concatenated to form a single address value. This address value is examined to determine whether it falls within a valid range for an EPROM memory access (element 148). If the address value is not valid, microcontroller 12 signals the host accordingly (block 154) and then waits for the next command (block 114 of FIG. 6A). If the address value is valid, the contents of the EPROM address are read out and transmitted to the host computer as shown by block 152. The sequence then returns to wait for further commands from the host (block 114 of FIG. 6A).

Interactive Programming Algorithm

Figure 5:
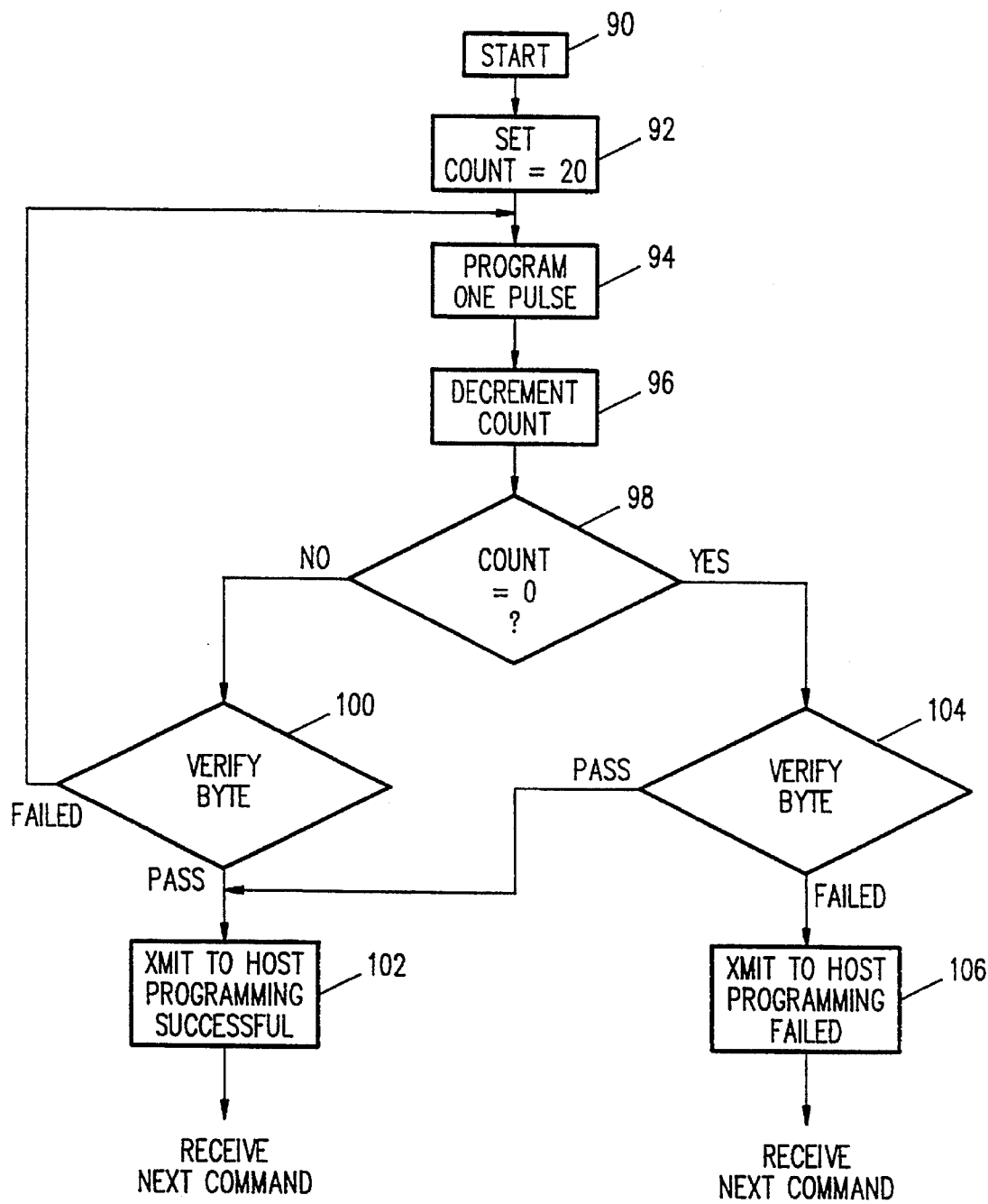
FIG. 5 is a flow chart depicting the interactive EPROM programming sequence.

As previously noted, EPROM 18 is preferably programmed utilizing an interactive programming sequence. Details of the interactive programming sequence are shown in the FIG. 5 flow chart. Initially, a software counter is set to a value of 20, as represented by blocks 90 and 92. Next, a first attempt to program EPROM 18 with one byte of received data (block 94) is made by generating one program pulse NPGM (FIG. 4). The EPROM Control Register (EPCR) 64 (FIG. 4) will be caused to produce the program pulse NPGM on line 82 by software executed from control ROM 20. The duration of this pulse will be determined by the prescaler value P obtained from a previously received Prescaler Information Command (Table 1). The interaction of software executing from control ROM 20 with timer/counter 80 (FIG. 4) will determine the duration of the NPGM pulse in accordance with the value P and equation (1). The data to be programmed are held in EPDR 74. (FIG. 4).

The counter is then decremented (block 96) and tested to determine whether the counter state has reached zero (element 98). Assuming that the count is non-zero, the data are checked by reading the EPROM at the address just programmed. If the data byte read out of the EPROM matches the byte temporarily stored in the RAM 13 (element 100), the programming was successful with a single program pulse. In that event, the host computer is so notified (block 102) and the sequence returns to the receive command block 114 (FIG. 6A).

Assuming that the single program pulse was not successful, (element 100) the sequence is repeated and a further programming pulse is produced (block 94), the counter decremented (block 96) and tested (element 98). In the event the sequence is repeated twenty times without a successful verification, the counter will be zero (element 98). One final attempt will then be made, as shown by element 104, to verify the byte by reading the address and comparing the byte of data from the EPROM with the byte of data stored in RAM 13. If the final attempt is not successful, the host is notified of the programming failure, as indicated by block 106. If the final attempt is successful, the host is notified (block 102) as previously described.

The subject microcontroller device reverts to the normal run mode, this being the default mode, when the device is not in any of the four other operational modes.

When the device is in the normal run mode, EPROM 18 (FIG. 4) functions as a read only memory (ROM) and contains the application program for the device. In this mode, the addresses for the EPROM 18 are loaded by the core 14 into the MAR register 68. Data are read out of EPROM 18 onto the main data bus 72.

In some instances, it is desirable to program EPROM 18 when the subject microcontroller is installed in a system with data originating in the application system or core 14 (and not from host computer 30). By way of example, if the subject device were used as part of an automobile antilocking brake system (ABS), it is desirable to have the capability of storing critical data in nonvolatile EPROM 18 for later evaluation. In the event of a brake failure, such critical data might be used to assist in determining the cause of the failure. The hardware which permits EPROM programming in the UART Program mode also permits EPROM programming under certain situations from data originating from the core 14. Such programming is sometimes referred to as run time programming, as previously explained.

Run time programming is accomplished by first increasing voltage Vpp on element 32 (FIG. 2) to +12.75 volts. Accordingly, a system design must be implemented to automatically increase Vpp in the event run time programming is to be carried out. Voltage sensor 34 causes the UART Program Mode (UPM) signal on line 62 to be produced thereby enabling the data register EPCR 74 (FIG. 4), control register EPDR 64, control ROM 20 and address register EPAR 66. Core 14 may then cause certain sections of software stored in control ROM 20 to program predetermined critical data to predetermined EPROM 18 addresses for later evaluation.

Thus, a novel microcontroller device and method of programming the device have been disclosed. Although the device and method have been described in some detail, it is to be understood that certain changes can be made by those skilled in the art without departing from the spirit and scope of the invention as defined by the appended claims.

We claim:

1. A data processing device implemented in a common integrated circuit which is programmable by way of a separate host computer, said device including:

a central processing unit;

a data bus associated with said central processing unit;

communication port means for providing a communication channel between the host computer and said central processing unit, with the communication channel carrying commands originating from the host computer, said commands including write data information and write address information;

a programmable nonvolatile first memory for storing application code to be processed by said central processing unit and which is coupled to said data bus, with said application code capable of being stored in the nonvolatile first memory within a range of nonvolatile first memory addresses; and control means, separate from said nonvolatile first memory, and including a control nonvolatile second memory in which a control program is stored, with the control means being a means for causing said central processing unit to execute the control program, with the central processing unit functioninq during execution of the control program to write data into the nonvolatile first memory based upon the command write data information of one of said commands received by the central processing unit at an address based upon the command write address information of one of said commands received by the central processing unit;

whereby any selected address of the nonvolatile first memory can be programmed by way of said host computer with selected data.

2. The data processing device of claim 1 wherein the host computer originates commands of varying types, such types including read commands and write commands, with the write commands including write commands that includes the write data information and write commands than include the write address information and wherein said control means includes command detect means for distinguishing between types of received commands.

3. The data processing device of claim 2 wherein the read commands include read address information and wherein the control means is also a means for causing said central processing unit to read data out of the programmable nonvolatile first memory at an address based upon said read address information in read commands received by the data processing device and to transmit the read data to the host computer over the communication channel.

4. The data processing device of claim 3 wherein the host computer originates a type of command referred to as a read block command and wherein the control means is also a means for causing said central processing unit to read out a block of data at two or more addresses in the programmable nonvolatile first memory in response to receipt of the read block command.

5. The data processing device of claim 4 wherein said block of data includes the entire contents of the programmable nonvolatile first memory.

6. The data processing device of claim 2 further including pulse means for generating a program pulse of variable pulse width which is received by the programmable nonvolatile first memory when data are written into the first memory and wherein the host computer originates a type of command referred to as a pulse width command which includes pulse width information and wherein the control means is also a means for controlling the program pulse width in response to the pulse width information in received pulse width commands.

7. The data processing device of claim 1 wherein said device is switchable between various operation modes including a normal run mode wherein said central processing unit is prevented from accessing said control nonvolatile second memory and a nonvolatile first memory program mode wherein said central processing unit executes said control program in said control nonvolatile second memory.

8. The data processing device of claim 7 further including mode control means for controlling said device operation mode and wherein one of said write commands includes both said write address information and said write data information.

9. The data processing device of claim 8 wherein said programmable nonvolatile first memory may be written into only when an input voltage to said programmable nonvolatile first memory is at a predetermined minimum value and wherein said mode control means is responsive to said input voltage.

10. The data processing device of claim 9 wherein the host computer originates commands of varying types, such types including read commands and write commands, with the write commands including the write data information and the write address information, and wherein said control means includes a data register for holding said data based upon said command write data information and a first address register for holding said address based upon said command write address information.

11. The data processing device of claim 10 further including a second address register for holding addresses for said programmable nonvolatile first memory when said device is in said normal run mode.

12. The data processing device of claim 10 wherein said communication port means includes a universal asynchronous receiver/transmitter device.

13. The data processing device of claim 12 wherein said control program in said control memory initializes said universal asynchronous receiver/transmitter device when said data processing device enters said nonvolatile first memory program mode.

14. A method of programming a programmable nonvolatile first memory of a data processing device utilizing a host computer separate from the device, with the device being implemented in a single integrated circuit and having a central processing unit which accesses application code stored in the programmable nonvolatile first memory at a range of the programmable nonvolatile first memory addresses, said method comprising the following steps:

storing a control program in a nonvolatile second memory of the device separate from the nonvolatile first memory;

transmitting commands from the host computer to the device, the commands including write address information and write data information for the nonvolatile first memory;

causing the central processing unit to execute the control program so that, during execution of the control program, the programmable nonvolatile first memory will be programmed at addresses based upon the write address information with data based upon the write data information; and causing the central processing unit to then access the programmable nonvolatile first memory while preventing the central processing unit from accessing the control program in the nonvolatile second memory, whereby the host computer can be used to write any selectable data into the programmable nonvolatile first memory at any address thereof within the range of programmable nonvolatile first memory addresses.

15. The method of claim 14 wherein said commands are received by the device over a serial interface circuit located on the device.

16. A data processing device implemented in a common integrated circuit which is programmable by way of a separate host computer, said device including:

a central processing unit;

a data bus associated with said central processing unit;

a data input/output port coupled to the data bus and including at least one external connection pin of the device;

communication port means, separate from said data input/output port, for providing a communication channel between the host computer and said central processing unit, with the communication channel carrying commands originating from the host computer, said commands including write data information and write address information;

a programmable nonvolatile first memory which is coupled to said data bus capable of storing an application code to be processed by the central processing unit within a range of programmable nonvolatile first memory addresses;

and control means, including a control second memory in which a control program is stored, for causing said central processing unit to execute the control program so that data is written into the programmable nonvolatile first memory during execution of the control program based on the command write data information of one of said commands received by the central processing unit at an address based upon the write address information of one of said commands received by the central processing unit.

17. The data processing device of claim 16 wherein the communication port means provides a serial communication channel and wherein a single one of the commands originating from the host computer contains both the command write address and command write data information.

18. The data processing device of claim 17 wherein the communication port means includes a transmit/receive device which is capable of being configured for transmitting data to the host computer and configured for receiving data from the host computer, with the configuration being controlled by the central processing unit.

19. The data processing device of claim 18 wherein the transmit/receive device is a universal asynchronous receiver/transmitter device.

20. The data processing device of claim 16 wherein said control second memory is a nonvolatile memory, with the control means causing said central processing unit to execute the control program in order to write the data into the programmable nonvolatile first memory.

* * * * *

UNITED STATES PATENT AND TRADEMARK OFFICE
CERTIFICATE OF CORRECTION

PATENT NO.  : 5,495,593
DATED       : February 27, 1996
INVENTOR(S) : Elmer et al.

It is certified that error appears in the above-indentified patent and that said Letters Patent is hereby corrected as shown below:

Column 14, Claim 16, Line 38, after "unit" insert
 --mode control means for switching the device between a normal run mode wherein the central processing unit is prevented from accessing the control second memory and a nonvolatile first program mode wherein said central processing unit executes the control program in said control nonvolatile memory;
 whereby selected data can be written into the programmable nonvolatile first memory at any selected address within the address range by way of the host computer--.

Column 14, Claim 20, Line 53, after "nonvolatile memory" delete ", with the control means causing said central processing unit to execute the control program in order to write the data into the programmable nonvolatile first memory".

Signed and Sealed this

Eighteenth Day of June, 1996

*Attest:*

BRUCE LEHMAN

*Attesting Officer*   Commissioner of Patents and Trademarks